(12) United States Patent
Bradford et al.

(10) Patent No.: US 8,140,833 B2
(45) Date of Patent: Mar. 20, 2012

(54) IMPLEMENTING POLYMORPHIC BRANCH HISTORY TABLE RECONFIGURATION

(75) Inventors: Jeffrey Powers Bradford, Rochester, MN (US); Richard James Eickemeyer, Rochester, MN (US); Timothy Hume Heil, Rochester, MN (US); Harold F. Kossman, Rochester, MN (US); Timothy John Mullins, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 11/246,820

(22) Filed: Oct. 7, 2005

(65) Prior Publication Data

US 2007/0083740 A1    Apr. 12, 2007

(51) Int. Cl.
*G06F 7/38* (2006.01)
*G06F 9/00* (2006.01)
*G06F 9/44* (2006.01)
*G06F 15/00* (2006.01)

(52) U.S. Cl. .................. 712/240; 712/239
(58) Field of Classification Search ........... 712/239–240
See application file for complete search history.

(56) References Cited

U.S. PATENT DOCUMENTS

| | | | |
|---|---|---|---|
| 5,367,653 A | 11/1994 | Coyle et al. | |
| 5,778,424 A | 7/1998 | Guy | |
| 5,884,098 A | 3/1999 | Mason, Jr. | |
| 6,016,535 A | 1/2000 | Krantz et al. | |
| 6,047,356 A | 4/2000 | Anderson et al. | |
| 6,058,456 A | 5/2000 | Arimilli et al. | |
| 6,240,502 B1 | 5/2001 | Panwar et al. | |
| 6,438,673 B1 | 8/2002 | Jourdan et al. | |
| 6,839,812 B2 | 1/2005 | Royer, Jr. et al. | |
| 6,898,687 B2 | 5/2005 | Wu et al. | |
| 7,454,602 B2 * | 11/2008 | Abernathy et al. | 712/240 |
| 2003/0204670 A1 | 10/2003 | Holt et al. | |
| 2004/0064642 A1 | 4/2004 | Roskind | |
| 2004/0184340 A1 | 9/2004 | Dwarkadas et al. | |
| 2004/0267954 A1 | 12/2004 | Shen | |
| 2005/0144387 A1 | 6/2005 | Adl-Tabatabai et al. | |
| 2006/0149951 A1 * | 7/2006 | Abernathy et al. | 712/240 |
| 2006/0277365 A1 | 12/2006 | Pong | |
| 2007/0061511 A1 | 3/2007 | Faber | |

OTHER PUBLICATIONS

Juan, Sanjeevan & Navarro; Dynamic History-Length Fitting: A third level of adaptivity for branch prediction; Jun. 1998; IEEE Computer Society; Proceeding of the 25th annual international symposium on Computer architecture; pp. 155-166.*

Stark, Evers & Patt; Variable Length Path Branch Prediction; Oct. 1998; ACM Press; Proceedings of the eigth international conference on Architectural support for programming languages and operating systems; pp. 170-179.*

(Continued)

*Primary Examiner* — Corey S Faherty
(74) *Attorney, Agent, or Firm* — Joan Pennington

(57) ABSTRACT

A method, apparatus and computer program product are provided for implementing polymorphic branch history table (BHT) reconfiguration. A BHT includes a plurality of predetermined configurations corresponding predetermined operational modes. A first BHT configuration is provided. Checking is provided to identify improved performance with another BHT configuration. The BHT is reconfigured to provide improved performance based upon the current workload.

7 Claims, 6 Drawing Sheets

OTHER PUBLICATIONS

Yeh & Patt; Two-Level Adaptive Training Branch Prediction; 1991; ACM Press; Proceedings of the 24th annual international symposium on Microarchitecture; pp. 51-61.*

Se-Hyun Yang, Michael D. Powell, Babak Falsafi and T.N. Vuaykumar, "Exploiting Choice in Resizable Cache Design to Optimize Deep-Submicron Processor Energy-Delay", to appear in the Proceedings of the 8th International Symposium on High-Performance Computer Architecture, Jan. 2001.

Parthasarathy Ranganathan, Sarita Adve and Norman P. Jouppi, "Reconfigurable Caches and Their Application to Media Processing".

* cited by examiner

IMPLEMENTING POLYMORPHIC BRANCH HISTORY TABLE RECONFIGURATION

FIELD OF THE INVENTION

The present invention relates generally to the data processing field, and more particularly, relates to a method, apparatus and computer program product a method, apparatus and computer program product for implementing polymorphic branch history table (BHT) reconfiguration.

DESCRIPTION OF THE RELATED ART

Most, if not all processors today use some form of branch prediction. Branches typically cause a multi-cycle bubble in a pipeline if nothing is done. With branch prediction, the processor predicts which way a branch will go. If the branch was correctly predicted, operation continues and the bubbles can be reduced. If the prediction was incorrect, all instructions along the speculative path are canceled or flushed and the bubbles are not eliminated.

Branches can often be predicted correctly 90% of the time, or more, with state-of-the-art prediction schemes using a branch history table (BHT). As a result of branch prediction, performance is improved significantly due to the typically high frequency of branch instructions.

Different applications, however, have different branching characteristics. Some commercial applications, for example, TPC-C an on-line transaction processing benchmark, have a large instruction footprint and, consequently, a large branch footprint where there are a large number if different branches in the code. Other applications have a small instruction footprint and a small branch footprint, such as SPEC CPU 2000, benchmark suites designed to provide performance measurements that can be used to compare compute-intensive workloads on different computer systems by Standard Performance Evaluation Corporation (SPEC).

When it comes to determining the size of a BHT, choosing an adequate size for large-footprint applications will result in unused space for small-footprint applications. There are other aspects to BHT design than just the size.

For example, each entry can have multiple prediction bits. There can be multiple BHTs where the result of one BHT is chosen based on yet another predictor, for example, eServer pSeries® Power4 system manufactured by International Business Machines Corporation.

Studies have shown that some workloads benefit more from a more complex predictor than others. In fact, commercial applications benefit from a large BHT more than they benefit from a complex BHT. SPEC CPU 2000 benefits more from a complex predictor than from a large predictor. Optimizing a BHT for one class of applications will be suboptimal for another class. Building a BHT that is both large and complex will add more cost than is necessary and may also impact the prediction latency.

SUMMARY OF THE INVENTION

Principal aspects of the present invention are to provide a method, apparatus and computer program product for implementing polymorphic branch history table (BHT) reconfiguration. Other important aspects of the present invention are to provide such method, apparatus and computer program product for implementing polymorphic branch history table (BHT) reconfiguration substantially without negative effect and that overcome many of the disadvantages of prior art arrangements.

In brief, a method, apparatus and computer program product are provided for implementing polymorphic branch history table (BHT) reconfiguration. A BHT includes a plurality of predetermined configurations corresponding predetermined operational modes. A first BHT configuration is provided. Checking is provided to identify improved performance with another BHT configuration. The BHT is reconfigured to provide improved performance based upon the current workload.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiments, a BHT design is provided that can be reconfigured to provide more overall performance across a wider range of workloads than a design that is static. Any of various BHT configurations can be used as one possible configuration among two or more BHT configurations.

Figure 1:
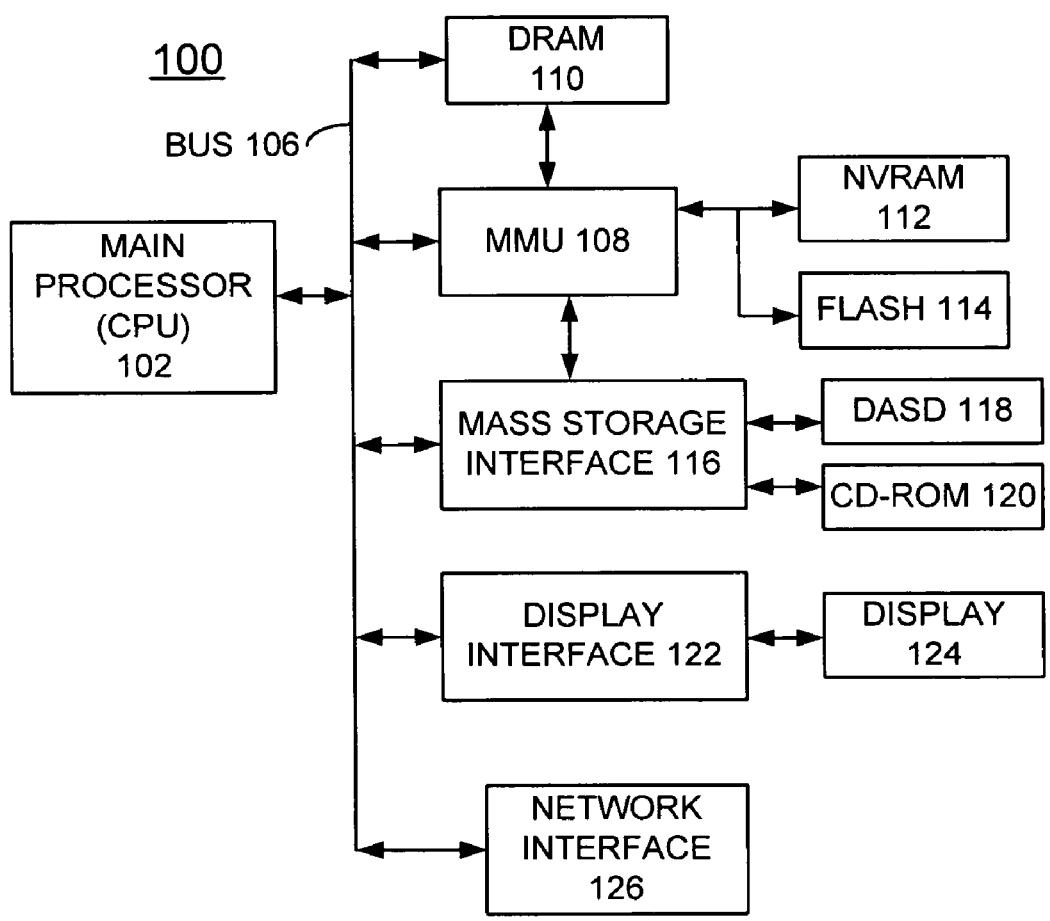
FIG. 1 is a block diagram representation illustrating a computer system for implementing polymorphic branch history table (BHT) reconfiguration in accordance with the preferred embodiment.

Having reference now to the drawings, in FIG. 1, there is shown a computer system generally designated by the reference character 100 for implementing methods for polymorphic branch history table (BHT) reconfiguration in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

Figure 3:
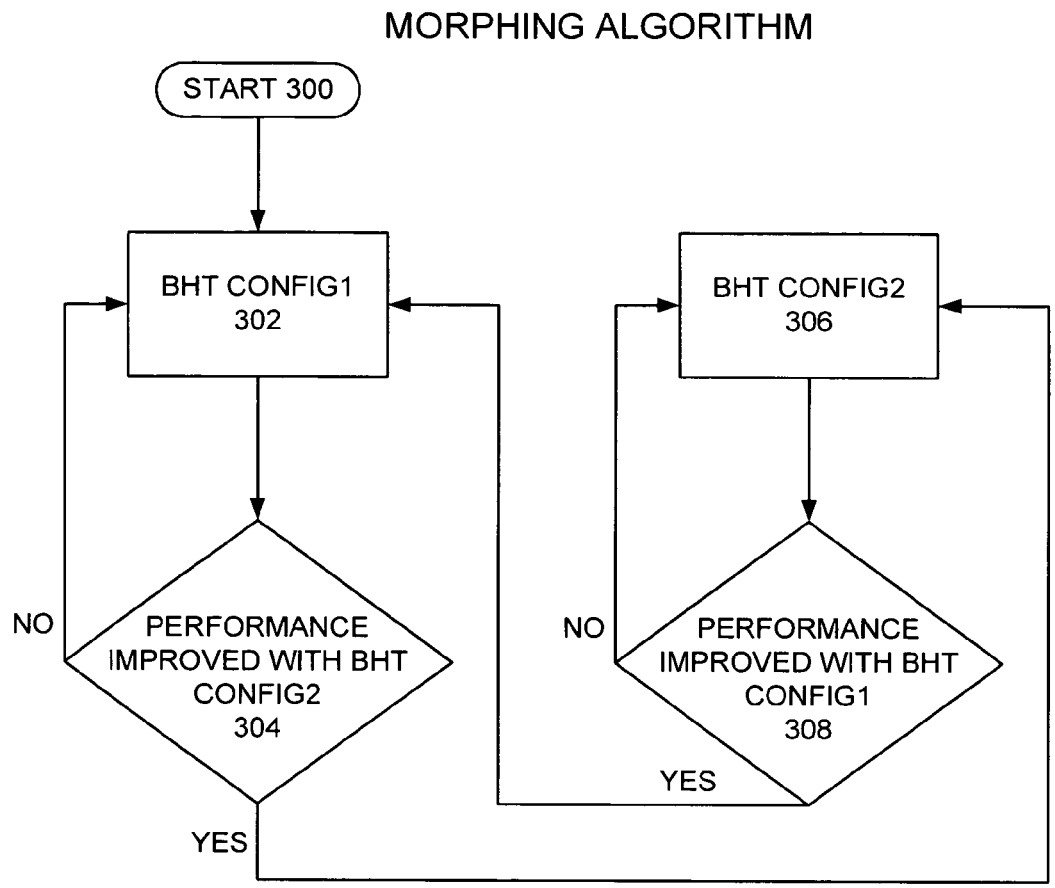
FIG. 3 is a flow diagram illustrating exemplary morphing algorithm steps for implementing polymorphic BHT reconfiguration in accordance with the preferred embodiment.

CPU 102 is suitably programmed or arranged for implementing methods for polymorphic BHT reconfiguration in accordance with the preferred embodiment, such as to execute the flowchart of FIG. 3. CPU 102 includes software, and/or adaptive hardware learning to make the decision to switch BHT configurations, for example, as shown at decision blocks 304, 308. Also a user selected entry can be provided to implement reconfiguration control to make the decision to switch BHT configurations, for example, as shown at decision blocks 304, 308.

In accordance with features of the preferred embodiments, the BHT configuration will switch between two modes as directed by software or by dynamic hardware feedback. It should be understood that the present invention is not limited to two modes or BHT configurations, more than two modes or BHT configurations also is possible.

In accordance with features of the preferred embodiments, a BHT is dynamically reconfigured to adjust to the characteristics of the workload that is currently running. The BHT configuration can switch between two or more different modes of operation based on the current workload characteristics and there are different ways in which this can be implemented.

In accordance with features of the preferred embodiments, basically, the BHT is designed to be accessed in at least two different ways. For a particular application, the BHT is accessed in a particular way, as instructed by the software, or another selector mechanism.

In accordance with features of the preferred embodiments, for example, an N-entry 2-bit-per entry BHT predictor can also be accessed as a 2N-entry 1-bit-per-entry BHT predictor. Workloads that can use a smaller BHT and see benefit from a two-bit predictor use this configuration of the BHT. Workloads that need more entries and do not see a significant benefit from a two-bit predictor can use the 1-bit-per-entry configuration. Of course, this is just one example of a reconfigurable BHT. Compared to the current state-of-the art, a reconfigurable BHT provides better performance across a wider range of workloads and can be achieved at a lower cost.

Figure 2A:
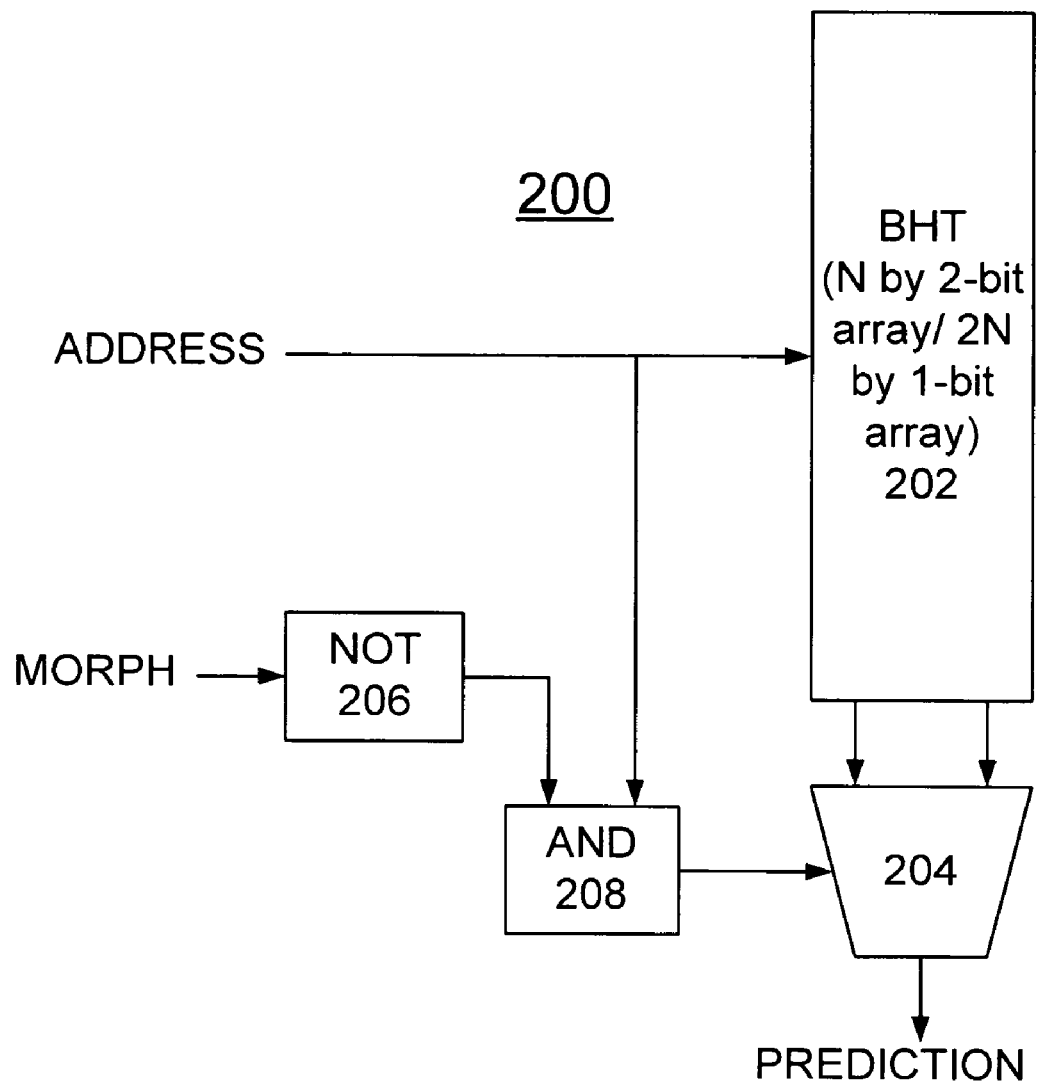
FIGS. 2A, 2B, and 2C are block diagram representations respectively illustrating an exemplary reconfigurable branch history table (BHT) of the computer system of FIG. 1 in accordance with the preferred embodiment.

Referring to FIG. 2A, there is shown an exemplary reconfigurable branch history table (BHT) generally designated by the reference character 200 for implementing methods for polymorphic branch history table (BHT) reconfiguration in accordance with the preferred embodiment.

Reconfigurable BHT 200 is arranged, for example, to be reconfigured from N 2-bit entries to 2N 1-bit entries. In a first configuration of BHT 200 the BHT 202 is organized as an N×2-bit array. An index as indicated by ADDRESS is formed, for example, with log(N) bits from a branch address, that is optionally XORed with branch pattern information. Two bits are read out of BHT 202 via a multiplexer 204 and used for prediction as indicated by the multiplexer output labeled PREDICTION. Similarly, the two bits are updated when needed within BHT 202.

To implement a 2N×1-bit branch predictor, the same index scheme is used. From the two bits read, one is selected using another branch address bit to reduce this prediction output to a single bit. This is the branch prediction. The bit is updated when needed within BHT 202. Reconfigurable BHT 200 includes logic designed to implement both these algorithms and to choose which one to use during a particular time interval.

As shown in the reconfigurable BHT 200 of FIG. 2A, the BHT 202 is indexed by a sufficient number of address bits and two BHT bits are output into a multiplexer 204. One additional address bit and the mode bit MORPH (0=1-bit algorithm; 1=2-bit algorithm) are combined by an AND gate 208 to form the MUX control. The two bit algorithm is a standard saturating counter where the prediction is from one bit; the second bit determines when the first bit changes. To update the prediction, both bits are saved in the branch queue, or with the branch instruction. In the 1-bit mode, the bit used is flipped if the branch was mispredicted and the two bits are written back. In the 2-bit mode, the bits are updated using the standard algorithm. If either bit changed, the pair is written back to the BHT 202. After a switch between the 1-bit mode and 2-bit mode, there is a brief period where the BHT 202 state is in transition, but it is updated quickly as branches are processed.

It should be understood that the BHT 202 is not limited to a 2-bit entry array to implement the reconfigurable BHT 200, for example, consider the BHT202 arranged as a 16-bit entry array. For example, 16 bits are read out at once, corresponding to 8 instructions. For a 1-bit predictor, an address bit selects one bit from each pair, and then the reduction from 8 bits to 1 takes place. For a 2-bit predictor, the 8 pairs of bits are reduced to one pair.

Figure 2B:
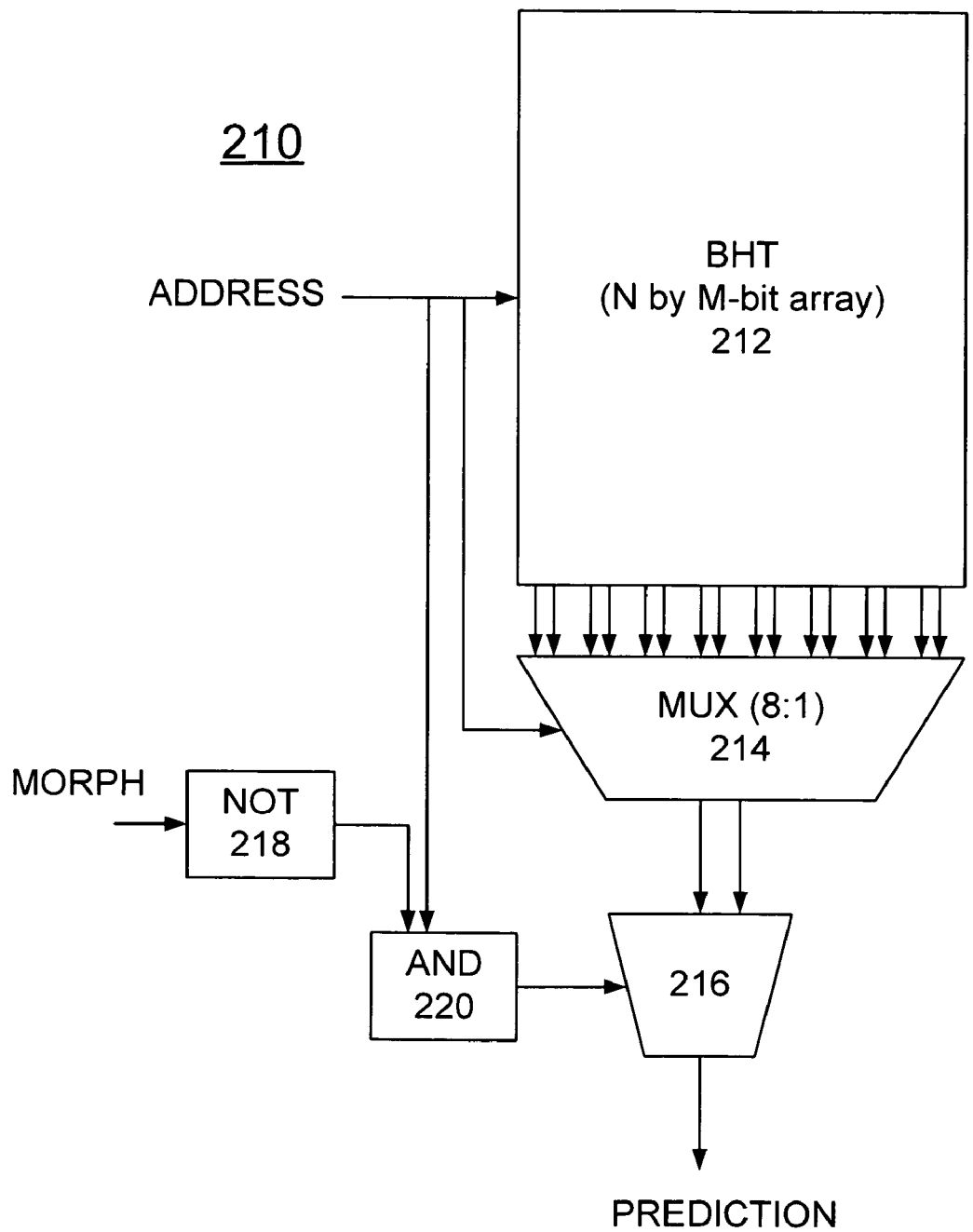

Referring to FIG. 2B, there is shown a second exemplary reconfigurable branch history table (BHT) generally designated by the reference character 210 for implementing methods for polymorphic branch history table (BHT) reconfiguration in accordance with the preferred embodiment. BHT 210 includes an N entry by M-bit array BTH 212, for example, an N by 16-bit array. A first multiplexer 214, such as an 8:1 multiplexer, receiving an address control input (3 bits in this example), reads out 16 bits (8 pairs of 2 bits) from BHT 212 and provides a 2 bit output applied to a second multiplexer 216. The second multiplexer 216 receives a control input generated by NOT gate 218 receiving the mode input MORPH coupled to an AND gate 220 receiving the address input. The two bits applied to multiplexer 216 are used for prediction as indicated by the multiplexer output labeled PREDICTION, for example, in a 1-bit mode or a 2-bit mode.

Figure 2C:
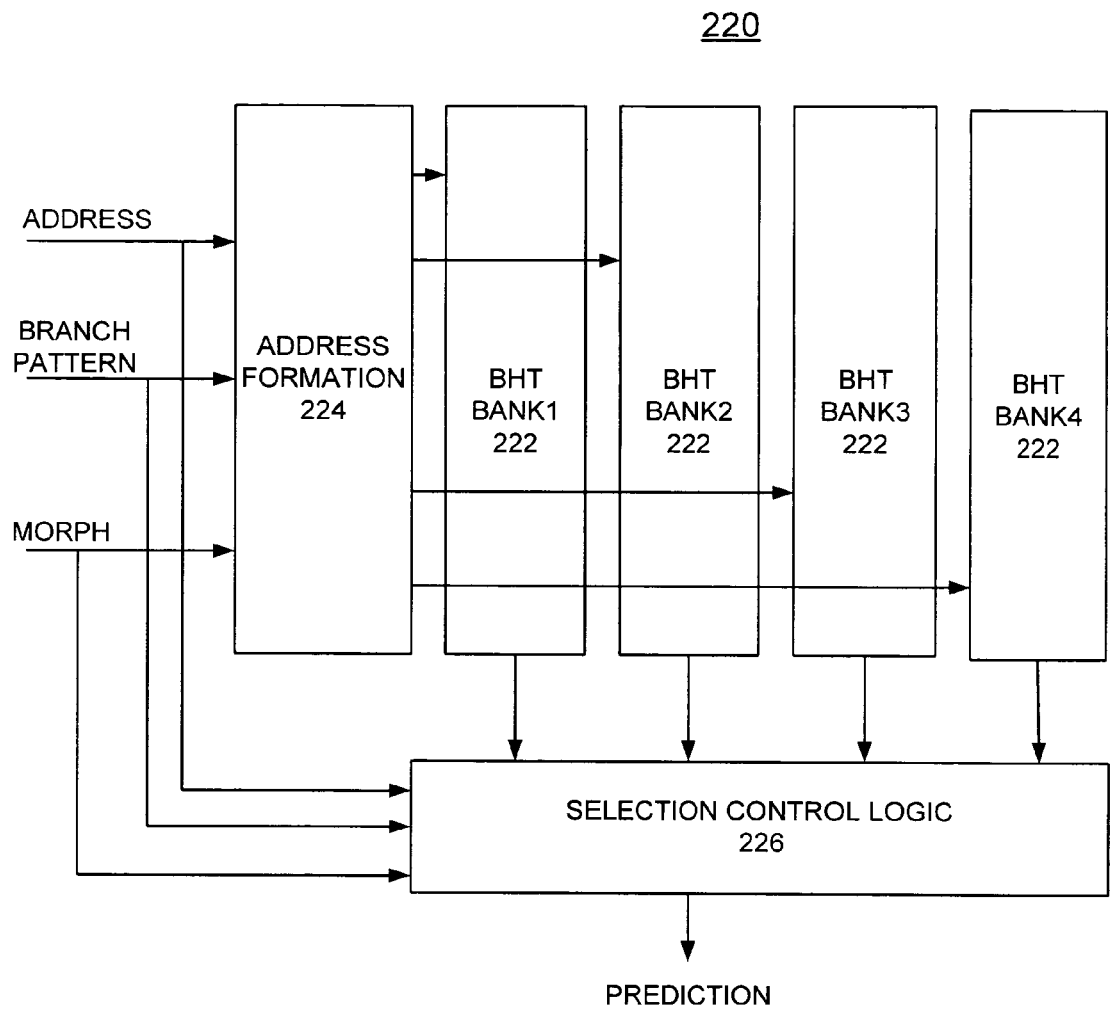

Referring to FIG. 2C, there is shown a third exemplary reconfigurable branch history table (BHT) generally designated by the reference character 220 for implementing methods for polymorphic branch history table (BHT) reconfiguration in accordance with the preferred embodiment.

Reconfigurable BHT 220 includes a plurality of independently addressable banks #1-4, BHT 222, each independently addressed with an independent address line. It should be understood that the independently addressable banks #1-4, BHT 222 could be of different sizes, and each also could be, for example, 1-bit in width or more. An address formation 224 receiving an address, branch pattern and a mode control input MORPH provides independent addresses to the independently addressable banks #1-4, BHT 222. A selection control logic 226 receiving an address, branch pattern and a mode control input MORPH provides a predictor output labeled PREDICTION. The predictor output of selection control logic 226 implements a selected configuration for reconfigurable BHT 220, such as a 1-bit predictor, a 2-bit predictor, or N-bit predictor responsive to the applied address, branch pattern and a mode control input MORPH.

For example, with independently addressable banks #1-4, BHT 222, each 1-bit in width, to implement a 1-bit predictor, the 4 banks each receive the same index ADDRESS and the 4 bits are reduced to 1-bit, for example, using two more address bits. Similarly, to implement a 2-bit predictor, the 4 bits are reduced to 2 using a second additional address bit.

By allowing independent addressability of the addressable banks #1-4, BHT 222, however, it should be understood that there are more configurations available. The four address lines could be made to be different with the address formation logic 224 to create a different embodiment. For example, different address lines can be used for different banks #1-4, BHT 222, or the address for some banks can include an XOR with the branch pattern. This embodiment can therefore support a variety of different configurations of the reconfigurable BHT 220. There is a choice of bank indexing algorithm that can be made for each bank of four addressable banks #1-4, BHT 222, independently, or all or some could be the same. The selection control logic 226 that reduces the outputs from the banks can be a simple selection, can use one bank to multiplex from the others, or other selected combining can be used. The hardware selection control logic 226 could choose to support just two different configurations or more than two.

FIG. 3 shows an exemplary mode switching process, given two BHT configurations such as illustrated in FIG. 2A, FIG. 2B or FIG. 2C, the one BHT configuration that is expected to provide better performance during a given time period is used.

Referring to FIG. 3, there are shown exemplary morphing algorithm steps for implementing polymorphic BHT reconfiguration in accordance with the preferred embodiment starting at a block 300. As shown, a first BHT configuration is BHT CONFIG1 as indicated in a block 302. Checking current workload to identify improved performance with another BHT configuration or BHT CONFIG2 is performed as indicated in a decision block 304.

If the BHT CONFIG2 would not provide improved performance, then the BHT CONFIG1 is maintained at block 302. If the BHT CONFIG1 would provide improved performance, then the BHT is reconfigured as indicated in a block 306. Checking current workload to identify improved performance with another BHT configuration or the BHT CONFIG1 is performed as indicated in a decision block 308. If the BHT CONFIG1 would not provide improved performance, then the BHT CONFIG2 is maintained at block 306. If the BHT CONFIG1 would provide improved performance, then the BHT is reconfigured to the BHT CONFIG1 at block 402. A user selected configuration can be provided, for example via a user selected mode bit applied to select the BHT CONFIG1 or BHT CONFIG2 at decision blocks 304, 308.

Figure 4:
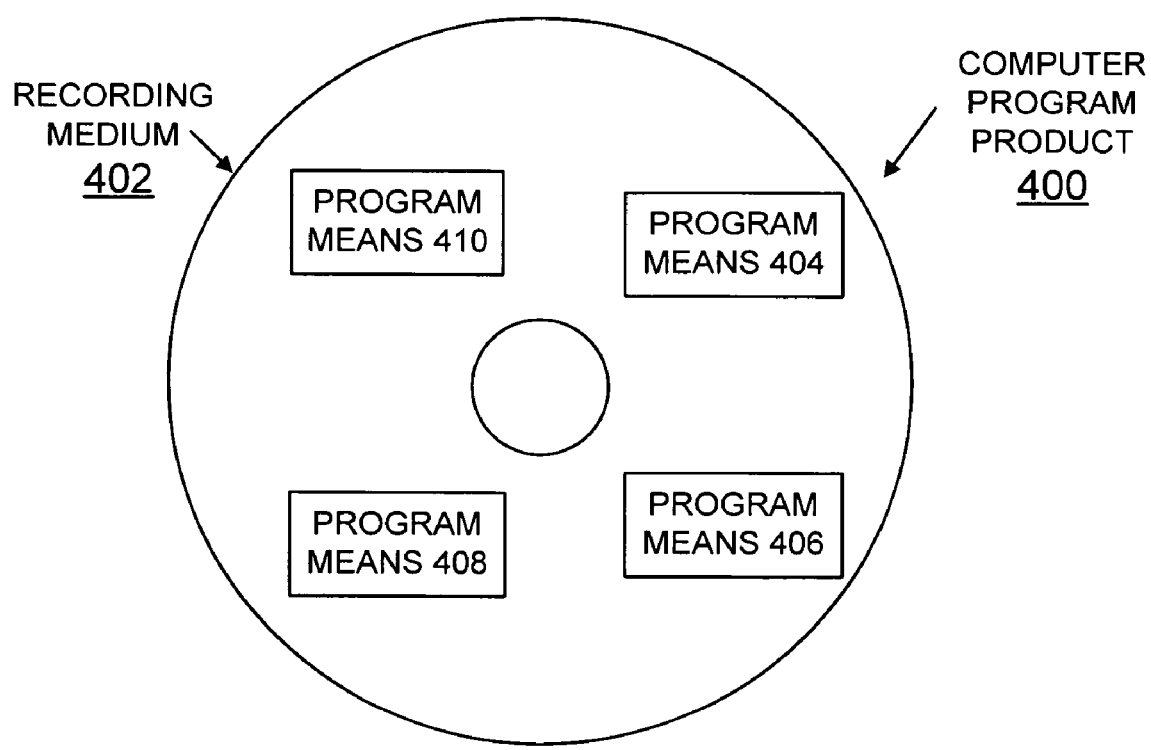
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing polymorphic BHT reconfiguration of the preferred embodiment in the system 100 of FIG. 1.

A sequence of program instructions or a logical assembly of one or more interrelated modules defined by the recorded program means 404, 406, 408, 410, direct the computer system 100 for implementing polymorphic BHT reconfiguration of the preferred embodiment.

While the present invention has been described with reference to the details of the embodiments of the invention shown in the drawing, these details are not intended to limit the scope of the invention as claimed in the appended claims.

What is claimed is:

1. A method for implementing polymorphic branch history table (BHT) reconfiguration comprising the steps of:
    providing a BHT including a plurality of predetermined different configurations corresponding to predetermined operational modes based upon current workload characteristics; said current workload characteristics including an application class; said BHT having a 2-bit configuration of said predetermined different configurations of N 2-bit entries for a 2-bit operational mode; said BHT having a 1-bit configuration of said predetermined different configurations of 2N 1-bit entries for a 1-bit operational mode;
    providing a mode control input for selectively accessing said BHT in one of said plurality of predetermined different configurations;
    providing said mode control input for selectively accessing said BHT in a first BHT configuration;
    checking the current workload characteristics to identify improved performance with another BHT configuration;
    selectively accessing said BHT in a second BHT configuration using said mode control input to provide improved performance based upon the current workload characteristics; and
    wherein checking current workload to identify improved performance with another BHT configuration includes identifying a user selected BHT configuration.

2. A method for implementing polymorphic BHT reconfiguration as recited in claim 1 includes providing said BHT including an N by 2-bit array.

3. A method for implementing polymorphic BHT reconfiguration as recited in claim 1 includes providing said BHT including an N by M-bit array.

4. A method for implementing polymorphic BHT reconfiguration as recited in claim 3 providing said BHT having a first configuration of N M-bit entries for a 2-bit operational mode.

5. A method for implementing polymorphic BHT reconfiguration as recited in claim 3 includes providing said BHT having a second configuration of 2N M/2-bit entries for a 1-bit operational mode.

6. A method for implementing polymorphic BHT reconfiguration as recited in claim 1 includes providing said BHT including a plurality of banks, each bank including an N by M-bit array.

7. A method for implementing polymorphic BHT reconfiguration as recited in claim 1 includes periodically checking current workload characteristics to identify improved performance with another BHT configuration.

* * * * *